(12) United States Patent
Banton et al.

(10) Patent No.: US 8,077,358 B2
(45) Date of Patent: Dec. 13, 2011

(54) SYSTEMS AND METHODS FOR IMPLEMENTING USE OF CUSTOMER DOCUMENTS IN MAINTAINING IMAGE QUALITY (IQ)/IMAGE QUALITY CONSISTENCY (IQC) OF PRINTING DEVICES

(75) Inventors: Martin Edward Banton, Fairport, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 589 days.

(21) Appl. No.: 12/109,203

(22) Filed: Apr. 24, 2008

(65) Prior Publication Data
US 2009/0268261 A1   Oct. 29, 2009

(51) Int. Cl.
*H04N 1/40* (2006.01)
*G06K 15/00* (2006.01)
*G06K 1/00* (2006.01)

(52) U.S. Cl. ....... 358/3.24; 358/1.9; 358/1.15; 382/112; 382/317

(58) Field of Classification Search .................. 382/112, 382/309, 162, 254, 317; 358/1.9, 406, 3.27, 358/3.24; 399/38
See application file for complete search history.

(56) References Cited

U.S. PATENT DOCUMENTS

| | | | |
|---|---|---|---|
| 4,278,344 A | | 7/1981 | Sahay |
| 4,607,385 A | * | 8/1986 | Maeda .......................... 382/179 |
| 4,941,023 A | | 7/1990 | Holmes et al. |
| 5,809,366 A | * | 9/1998 | Yamakawa et al. .............. 399/39 |
| 5,884,118 A | | 3/1999 | Mestha et al. |
| 6,002,890 A | | 12/1999 | Jackson et al. |
| 6,240,205 B1 | | 5/2001 | Fan et al. |
| 6,347,153 B1 | | 2/2002 | Triplett et al. |
| 6,473,197 B1 | * | 10/2002 | Shimazaki ...................... 358/1.9 |
| 6,665,425 B1 | | 12/2003 | Sampath et al. |
| 6,804,473 B2 | * | 10/2004 | Nakamura et al. .............. 399/16 |
| 6,873,432 B1 | | 3/2005 | Thieret |
| 6,883,892 B2 | | 4/2005 | Sievert et al. |
| 7,024,152 B2 | | 4/2006 | Lofthus et al. |
| 7,061,630 B2 | | 6/2006 | Murray |
| 7,123,873 B2 | | 10/2006 | deJong et al. |
| 7,136,616 B2 | | 11/2006 | Mandel et al. |
| 7,206,532 B2 | | 4/2007 | Lofthus et al. |
| 7,271,935 B2 | * | 9/2007 | Coons et al. .................... 358/2.1 |
| 7,272,333 B2 | | 9/2007 | Mizes |
| 7,349,124 B2 | * | 3/2008 | Zuber ............................ 358/1.9 |
| 2003/0234960 A1 | * | 12/2003 | Kaltenbach et al. ......... 358/3.24 |
| 2004/0085562 A1 | | 5/2004 | Fromherz |
| 2004/0088207 A1 | | 5/2004 | Fromherz |
| 2005/0220324 A1 | * | 10/2005 | Klein et al. ................... 382/112 |
| 2005/0278050 A1 | | 12/2005 | Ruml et al. |

(Continued)

*Primary Examiner* — Charlotte M Baker
*Assistant Examiner* — Aaron R Gerger
(74) *Attorney, Agent, or Firm* — Pillsbury Winthrop Shaw Pittman LLP (57) ABSTRACT

This invention generally relates to systems and methods for implementing use of customer documents in maintaining Image Quality (IQ)/Image Quality Consistency (IQC) of printing devices. The system may include an image analyzer configured to analyze input image data for a document and to identify one or more relevant pages of the document that may provide information regarding the state of the printing system; a scheduler that selects the relevant pages for printing out-of-order; a marking engine constructed to print images; a scanning device for scanning print images of the one or more relevant pages; and a buffer for holding the print images of the one or more relevant pages and inserting the print images of the one or more relevant pages into the media path in proper order. A method for analyzing printed documents is also provided.

26 Claims, 7 Drawing Sheets

U.S. PATENT DOCUMENTS

| | | | |
|---|---|---|---|
| 2006/0110009 A1* | 5/2006 | Klassen et al. | 382/112 |
| 2006/0114313 A1* | 6/2006 | Moore | 347/262 |
| 2006/0115287 A1 | 6/2006 | Roof | |
| 2007/0140571 A1 | 6/2007 | Fan et al. | |
| 2008/0079210 A1 | 4/2008 | Nakada et al. | |
| 2009/0147298 A1* | 6/2009 | Takahashi et al. | 358/1.15 |

* cited by examiner

SYSTEMS AND METHODS FOR IMPLEMENTING USE OF CUSTOMER DOCUMENTS IN MAINTAINING IMAGE QUALITY (IQ)/IMAGE QUALITY CONSISTENCY (IQC) OF PRINTING DEVICES

FIELD APPLICATION

This application generally relates to systems and methods for implementing use of customer documents in maintaining Image Quality (IQ)/Image Quality Consistency (IQC) of printing devices.

BACKGROUND

Image rendering devices such as photocopiers, printers, facsimile machines, and other image producing devices, have been widely used in commerce and industry. Computing devices have also been widely used in commerce and industry. Higher demand for these computing devices has resulted in faster processing speeds that are sufficient for electronically detecting defects in the images rendered by image rendering devices. Detection of image quality defects ensures the production of quality images by image rendering devices It is desirable to be able to take measurements from actual customer documents. This is advantageous in that it avoids the printing of numerous test patterns that would ordinarily be required to acquire information concerning device performance. There are various existing approaches for detecting image quality defects in images rendered by image rendering devices. In order to detect image quality defects, images rendered by an image rendering device, such as a printer, are captured by an image capturing device, such as a camera, a scanner, or the like, and are compared with synthetic models of an ideal scene (e.g., a standard test page or proofer's page designed to provide information about the performance of the printer) to detect the existence of an artifact or defect in the image. One such system was proposed in U.S. Patent Application Publication No. 2006/0110009, herein incorporated by reference, by its entirety.

In a high speed printer, whether having a single engine or multiple engines such as in a tightly integrated parallel printing (TIPP) system, each page of the document may not be able to be both printed and scanned reliably at the full media path speed. For example, representative high speed printing and scanning speeds for various Xerox products are as follows: DC8000 printer, 80 ppm (color); DC5000 printer, 50 ppm (color); iGen3® printer, 110 ppm (color); and DigiPath scanner, 40 ppm (color).

Hence, the current systems' performance may be limited (such as trading off resolution for speed).

SUMMARY APPLICATION

According to one aspect of the application, an image printing system configured for analyzing printed documents is provided, comprising: an image analyzer configured to analyze input image data for a document and to identify one or more relevant pages of the document that provides information regarding a state of the printing system; a scheduler configured to select the relevant pages for printing out-of-order; a marking engine constructed to print images on the pages of the document based on the input image data and the order selected by the scheduler; a scanner for scanning, the image printed on the one or more relevant pages; and a buffer for holding the one or more relevant pages post-scanning and inserting the one or more relevant pages into the media path in proper order in the document.

According to one aspect of the application, a method for analyzing printed documents is provided, comprising: analyzing input image data for a document and identifying one or more relevant pages of the document that provides information regarding a state of the printing system; scheduling to print the one or more relevant pages out-of-order from the order of the input image data; printing images on the pages of the document based on the report images data and the order selected by the scheduler; scanning the image printed on the one or more relevant pages; and inserting the one or more relevant pages post-scanning into the media path in proper order in the document.

Other objects, features, and advantages of one or more embodiments of the present invention will seem apparent from the following detailed description, and accompanying drawings, and the appended claims.

BRIEF DESCRIPTION OF THE DRAWINGS

Embodiments of the present invention will now be disclosed, by way of example only, with reference to the accompanying schematic drawings in which corresponding reference symbols indicate corresponding parts, in which.

DETAILED DESCRIPTION OF APPLICATION

Figure 1A:
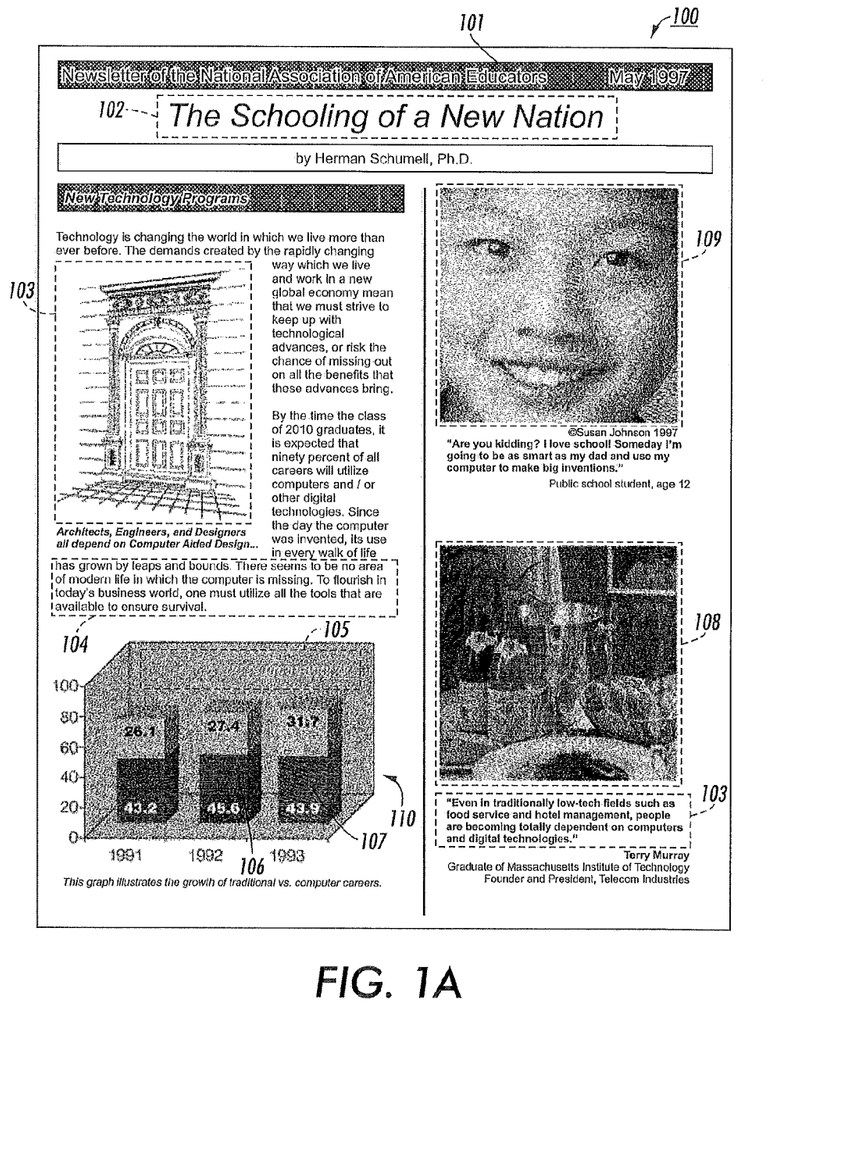
FIGS. 1A-1C show examples of how knowledge of the input image data can be used to diagnose operations of a marking engine subsystem.
Figure 1B:
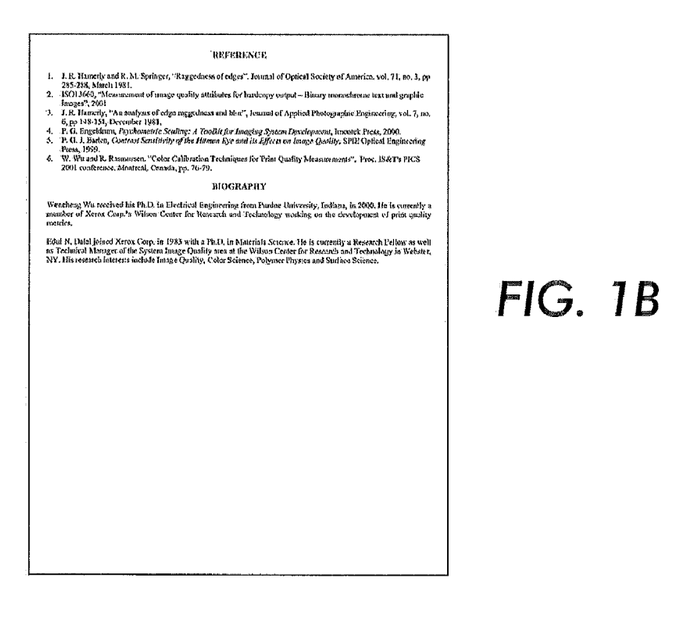
Figure 1C:
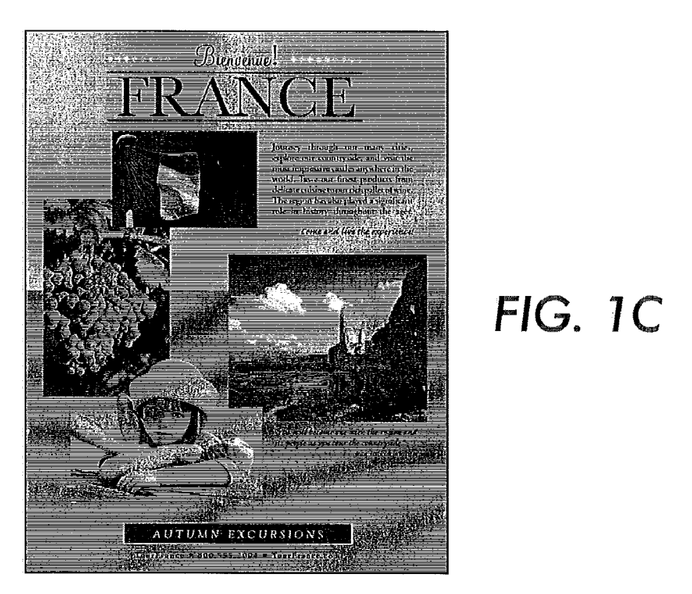

FIGS. 1A-1C show examples of how knowledge of the input image data can be used to diagnose operations of a marking engine subsystem. Image data is often stored in the form of digital image data files comprising multiple scanlines, each scanline comprising multiple pixels. When processing image content, it is helpful to know the type of image represented by the content. For instance, the input image data may represent graphics, text, a halftone, contone, or some other recognized image content type. A document of image content may be all one image content type, or some combination of different image content types.

As shown in FIG. 1A, an exemplary page 100 of a document is illustrated having various image content types. For example, the page 100 may have one or more of the following image content types: black solid 101; colored text 102; black lines 103; black text 104; areas of constant halftone 105; saturated colors 106, 107; halftones 108, 109; and substrate 110.

Various image content types present in the customer documents can be determined by the image analysis software using algorithms. For example, algorithms that identify the image content types of a document are disclosed in U.S. Pat.

Nos. 6,240,205 B1; and 6,347,153 B1, and U.S. Patent Application Publication No. 2007/0140571 A1, herein incorporated by reference, in their entirety.

The knowledge of the image content obtained from the different image content types gathered from customer documents enables analysis of parameters from actual printed customer document to provide diagnosis information regarding the status of the printing system. Also, the use of the various image content types present in customer images enables assessment of the various parameters achieved with the marking engine state in the printing system.

For large documents, for example, having one hundred or more pages, only a few pages of the document may be useful for extracting important information about the state of the printing device. FIGS. 1B and 1C illustrate two exemplary pages of a document. Generally, the majority of the pages of the document are mainly text, as illustrated in FIG. 1B. However, a page comprising a halftone image, for example, as illustrated in FIG. 1C, may also be included in the document. Thus, according to one implementation, the page shown in FIG. 1B may be used for detecting background noise, while the page shown in FIG. 1C may be advantageous for detecting color and uniformity defects.

Figure 2:
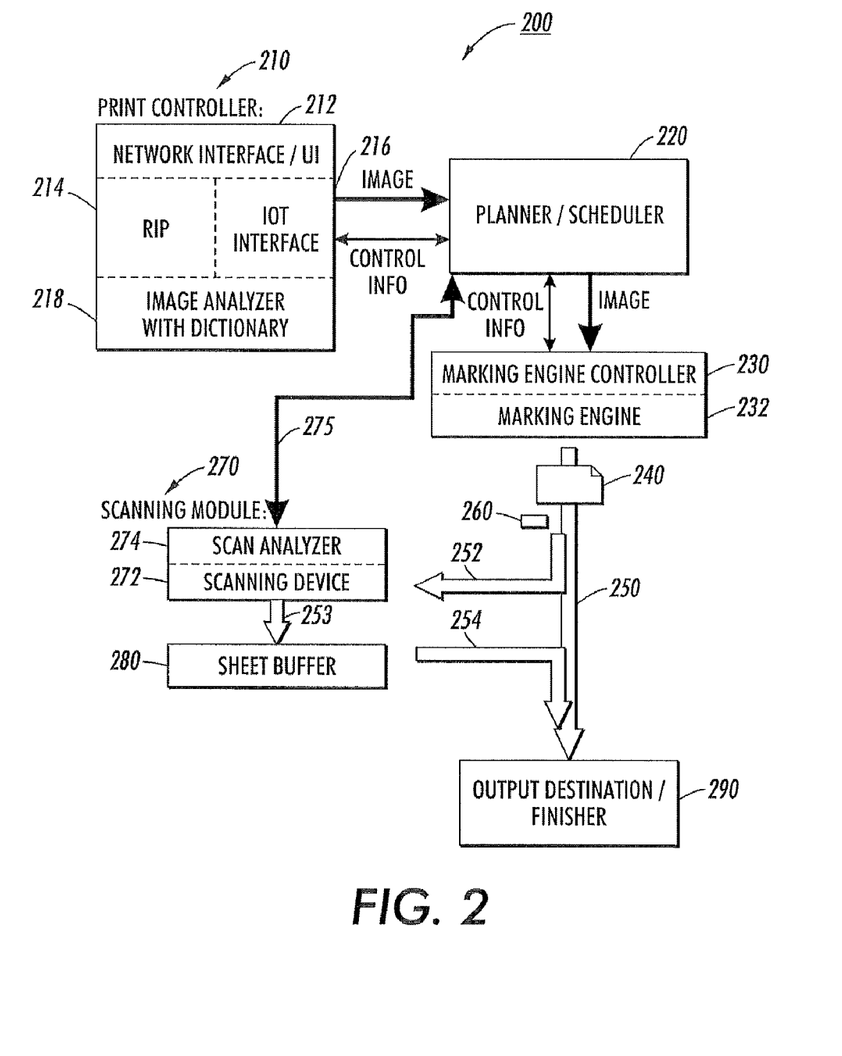
FIG. 2 illustrates an exemplary schematic for a system architecture, according to one embodiment of the invention.

FIG. 2 illustrates an exemplary schematic for a system architecture 200 according to one embodiment of the invention. Customer documents may be sent to a print controller 210, for example, through a network interface and/or user interface (UI) 212. The print controller 210 is used to manage print devices e.g., color laser printers, production printers, and digital presses, especially in high-volume environments. In one embodiment, the print controller 210 may be a Digital Front End (DFE).

Image content in digital forms (i.e., a data file) is accepted, stored, produced, decomposed or otherwise presented at the print controller 210. The print controller 210 accepts content for images desired to be printed in any one of a number of possible formats, such as, for example, TIFF, JPEG, or Adobe® PostScript™. This image content is then "interpreted" or "decomposed" in a known manner into a format usable by the marking engine controller (or multiple marking engine controllers in a TIPP system). The print controller increases productivity by efficiently automating digital workflow.

Typically, the print controller 210 is an external device, such as a computer or server, that interfaces to a network and typically will accept image content and process the image content for a copier or printer devices. However, the print controller 210 may be a part of the printing device itself. For example, the Xerox® iGen3® digital printing press may incorporate a print controller. Alternatively, the iGen3® may also enable use of third party controllers. By having knowledge of each pixel individually, the print controller can process each pixel of the image content more intelligently.

The print controller 210 may receive the input image data for customer documents via a network (or alternatively through an attached scanner). The print controller 210 identifies the objects types and their locations on the customer documents that will be printed. The object types and their locations on the customer documents may be identified by the print controller 210 using image analysis software, as described above.

The print controller 210 sends both the image data from the image, and the control information to a planner/scheduler 220. In other embodiments (not shown), the image content may be sent to the marking engine controller 230 directly at the direction of the planner/scheduler 220. All of this depends on the specific architecture of the printer system 200, print controller 210, planner/scheduler 220, and/or marking engine controller 230.

The print controller 210 may include a raster image processor (RIP), 214 that accepts an input Page Description, for example, as described by a page description language (PDL), such as PostScript, and produces a bitmap. Generally, for graphics and text, the color representation in PostScript is 'real,' or floating point, and is represented in 32 or 64 bits. For objects that are images (e.g., a JPG file), they are generally 8 bits per color separation, but can also be 12 or 16 bits (though this is not as common). Where the PDL of the incoming image data is different from the PDL used by the printing system, a suitable conversion unit (not shown) located in the interface unit may convert the incoming PDL to the PDL used by the digital printing system.

The bitmap is then passed to an image output terminal (IOT) interface 216. The IOT interface 216 may further perform image processing to make corrections or compensation to correct for deviations in the printing process. Grayscale image data is advantageously provided to the IOT interface 216 because binary data cannot be easily image processed, without more complicated image processing to convert it back to something like grayscale.

The printer controller 210 also includes an image analyzer 218 that determines whether a given page of the document would be a "relevant page." The term "relevant page," includes, but is not necessarily limited to, one or both of an "eligible page" and a "critical page." The term "eligible page" refers to a page that the system is able to extract and analyze useful information regarding the status of the printing system. The term "critical page" refers to a page which has content that requires a higher level of image quality consistency (IQC) than an ordinary page. For example, one such page may include a halftone image or a proofer's page.

The image analyzer 218 may execute a series of image and document analyses on the input image data to determine whether one or more pages in the input document (file) might be a relevant page worth scanning. This preliminary analysis is performed on the original input image data to determine which information, e.g., pages of the original electronic image, may be candidates for use as diagnostics. In some implementation, the image analyzer 218 may eliminate various types of image data that are not considered to provide information about rendering behavior that may be useful in determining defects in the image rendered by the rendering device, e.g., a printer, to reduce or even avoid image quality defects. For example, the image analyzer 218 may consider whether there is minimum amount of coverage of the current page, there are enough distinctive features in the current page for registration, and/or that there the current page has at least one color separations. In some implementations, some pages may be too complicated to extract useful information, and may simply be ignored altogether. Exemplary methods for such analysis are disclosed, for example, in U.S. Patent Application Publication No. 2006/0110009, mentioned above.

In addition, the image analyzer 218 may include a dictionary feature, which describes user (customer) preferred document types to be used for a specific marking engine (or family of marking engines). The dictionary may be used to assist the determination of the eligibility of a relevant page by the image analyzer 218. In one embodiment, a plurality of dictionaries may be provided, each dictionary being user (customer) specific. Different dictionaries may also be provided for different print engines and/or for distinct machine models (e.g., black and white, color, Hi-Lite colors, pantome colors, etc.). The dictionary may also take into account different print media type or paperstock.

In one implementation, electronic dictionary files may be loaded into memory of the image analyzer 218 from a central location and/or downloaded remotely. The dictionary files may include threshold (e.g., lower and upper) levels and/or variances for each characteristic and/or parameter to be measured. Dictionary files may also automatically capture settings (e.g., thresholds in the scanning device), the type of defects of interest (e.g., streak, background noises, mottle, etc.) and critical colors (e.g. red), and the like from the system.

For example, if a particular marking engine 232 is known for its macro-uniformity issues such as bandings, streaks, spots, mottle, etc., the relevant pages for scanning would be those with large color background areas (e.g., as shown in FIG. 1C). On the other hand, if a marking engine is known for its background noise, then the preferred relevant pages would be those with large white and/or blank areas (e.g., as shown in FIG. 1B) which may be suitable for detecting the presence of background noises. The dictionary may store the preferred parameters used in the algorithm for determining the eligibility, rather than the preferred document types themselves. Moreover, the user (customer) may determine which image quality (IQ) aspects are of importance. In some implementations, the user (customer) may select a particular dictionary via the user interface 212. The user may also input and/or edit individual characteristic and/or parameters of interest in the dictionary if desired.

As documents are received by the print controller 210 via the Network Interface/UI 212 they are placed in queue (in memory) for printing. In the system, the extraction of useful information includes performing a series of image and detection analyses on the input image data of customer documents, deriving the compensation signals for defects or alerting the control of printing devices for actions aiming to maintain its IQ/IQC. Exemplary correction methods and workflow of such analyses and/or alerting mechanisms can be found, for example, in U.S. Patent Application Publication No. 2006/0110009, mentioned above. In addition to maintaining IQ/IQC performance, the output of the analysis can also be used to enhance the ability of the planner/scheduler 220 for optimally scheduling the printing of relevant pages.

The image analyzer 218 may also advantageously provide a "lookahead" feature that analyzes page content, not only for relevant pages in the current document to be printed, but relevant pages in other documents in the queue, prior to the instance at which they would ordinarily be printed.

The image analyzer 218 alerts the planner/scheduler 220 of the existence of a relevant page along with image and control information. In some implementations, the control information may include a map of that page which defines the type and location of the feature(s) of interest on the page and the page number. While the image analyzer 218 is shown as being apart of the print controller 210, in some implementations, the image analyzer 218 may be separate from the print controller 210.

The planner/scheduler 220 schedules the printing of each of the pages of the document, whether relevant or non-relevant. In addition, the planner/scheduler 220 requests relevant pages, out-of-order, for printing, so as to minimize the overall print time for scanning relevant pages and printing a particular document. For example, by printing relevant pages, out-of-order, the scanning and analysis of the relevant pages can occur substantially during the printing of the remaining (non-relevant) pages. This may be especially advantageous for printing large documents (e.g., 100 or more pages) and multiple documents. The planner/scheduler 220 knowing the time it takes to scan and analyze each relevant page, may request relevant pages out-of-order of the normal printing order specified in the input image data for the document. While, the planner/scheduler 220 is shown being separate from the print controller 210, in some implementations, the planner/scheduler 220 may be a part of the print controller 210.

The planner/scheduler 220 forwards the input image data to the marking engine controller 230 for printing along with image data and control information. The control information may include a map of the page along with object types and their locations on the page. The marking engine controller 230 controls one or more marking engines 232, which is constructed to print images of a document. As will be appreciated, the system may advantageously be used for printing systems having a single marking engine or for TIPP systems having multiple marking engines. The planner/scheduler 220 also forwards information regarding the relevant pages to the scanning module 270 via path 275.

The marking engine controller 230 controls the marking engine 232, which is configured to print images. The marking engine 232 generally operates at a constant speed. A media handling subsystem (not shown) delivers a sheet of media to the marking engine 232 at a precisely specified time window for printing. Generally, the print media will be a sheet of paper, although it will be appreciated that various paperstock or other print media types may advantageously be used, alternatively, or in addition to paper. The precise time of arrival of the media is controlled because the arrival time determines the position that the image is printed on the media. If the sheet is delayed, even just slightly, the image position may be compromised (e.g., outside the required position specifications). This could cause the machine to shut down and/or a "paper-jam."

The marking engine controller 230 advantageously keeps track of the locations of all the sheets within in the system 200. With the availability of bidirectional media paths, an automatic system can be put in place to salvage prints that have not been damaged. In one implementation, the system may be configured for example, as disclosed in U.S. patent application Ser. Nos. 11/542,493, filed Oct. 3, 2006, entitled "Automatic Self-clearing Feature For Paper Jams In Marking Machine," and 11/642,028, filed Dec. 19, 2006, entitled "Bidirectional Media Sheet Transport Apparatus," which are incorporated herein by reference, in their entirety, for handling paper jams.

There will, of course, be instances when sheets may have to be discarded. However, the marking engine controller 230 may advantageously request reprints of those sheets. In the case of a relevant page, the planner/scheduler 220, based on information from the marking engine controller 230, may reschedule reprinting of the relevant sheets so that scanning of those sheets can be performed in sufficient time to reinsert the relevant pages where they belong in the document. In some implementations, the system may incorporate exception handling technology, for example, as disclosed in U.S. patent application Ser. No. 11/612,908, filed Dec. 19, 2006, entitled "Exception Handling," which is incorporated herein by reference, in its entirety.

In TIPP systems, there are parallel media paths that are especially amenable to salvaging at least a good number of the pages in the system. By placing the scanning module 270 close to the output destination/finisher 280, there is a very good chance that any relevant pages would already have been scanned and be waiting in the buffer for reinsertion.

After being printed with the marking engine 232, the printed images 240 proceed along an output media path 250 toward the output destination/finisher 280. Located between the marking engine and the output destination/finisher 280 is a page diverter 260 for selectively diverting relevant pages via media path 252 to the scanning module 270. The page diverter 260 may be a gate mechanism or other mechanical device (e.g., air jets, belt, conveyer, or the like) for selectively diverting sheets of media from one media path to another. and ready for reinsertion.

The scanning module 270 provides high quality scanning of relevant pages of customer documents without sacrificing the productivity of the marking engine. In some embodiments, the scanning media path 252 and output 250 media path may be parallel to each other. Moreover, by providing the scanning module 270 separate from the output media path 250, the scanning of the relevant pages may not slow down the output media path 250 for printing. The relevant pages that have been scanned will be later reintroduced or reinserted into the output media path of system, so as to retain the proper pagination (i.e., page order) of the output document.

For TIPP systems, the printed media from the various marking engines may be collected and delivered to an exit pathway to the page diverter 260. If the printed image is not a relevant page, then that page proceeds along the output media path 250 to the output destination/finisher 280. Thus, only relevant pages will ordinarily be transferred from the output media path 250 to the scanning module 270. In one implementation, all the relevant pages may be printed and scanned prior to the printing of the non-relevant pages. However, it will be appreciated that, in some implementations, non-relevant pages may also be scanned, if desired.

The scanning module 270 scans and analyzes the printed relevant pages. The scanning module 270 may comprise a scanning device 272 and associated scan analyzer 274 for processing the scanned image data obtained by the scanning device 272. The scanning device 272 may include one or more of the following: a digital scanner, full width array (FWA) sensor; charge-coupled device (CCD) scanning technology and optical arrangements; a full-width gloss scanning device, or the like, which scans in a "high quality" mode. The term "high quality" refers to image resolution of about 300 dpi and above. Currently, Xerox Corp. is using 600 dpi in its high image quality (IQ) line of scanners, which is more than sufficient for the purposes of the application. The term "high quality" may also be referred to as Motion Quality (MQ) or color-to-color registration.

High-quality Motion Quality is required for most scanning measurements. This is especially true for parameters like the registration of the image to the edge of a sheet. Also, excellent MQ is necessary for diagnosing certain objectionable artifacts, such banding, which is a regular variation in reflectance of an image due to the fact that there is a periodic motion error somewhere in the system. For example, customers are able to see very small periodic changes in reflectance. This is especially true for an area of the page that is required to have a constant halftone density, such as, for example, region 105 in FIG. 1A.

In one implementation, the scanning device 272 may include a full width array (FWA) gloss measuring device, such as the one disclosed in U.S. patent application Ser. No. 11/783,174, filed Apr. 6, 2007, entitled "Gloss And Differential Gloss Measuring System," which is incorporated herein by reference, in its entirety. From this data, information of interest and various parameters may be extracted to determine the state of the system and printed documents.

The scanning device 272 produces raw data for the scanned relevant pages. The raw data may include data corresponding to the object types and their locations identified by the image analyzer 218. The scan analyzer 274 associated with the scanning device 272 may be a separate processor for analyzing one or more image quality parameters of the printed media, such as a gloss, differential gloss, color (e.g., CIE (L*a*b color space)) and color difference, reflectance at specific wavelengths (color), background noise, image geometries (such as image to print media alignment, size of image, e.g., whether it has been magnified or reduced), or other non-uniformity errors, such as streaks, smudges, mottle, registration, bands (i.e., periodic "streaks" which are perpendicular to the normal streak direction), line edge noise, or other artifacts. An algorithm for determining gloss, for example, is disclosed, in U.S. patent application Ser. No. 12/023,306, filed Jan. 31, 2008, entitled "USE OF CUSTOMER DOCUMENTS FOR GLOSS MEASUREMENTS" which is incorporated herein by reference, in its entirety.

The scanning device 272 is advantageously much more sensitive than the human eye and may discern non-uniformities and defects well before a person (i.e. the customer) may be capable of doing so. It will be appreciated that any characteristic and/or parameter that would be recognizable or objectionable to the customer, which may be readily determined or measured, may advantageously be scanned and analyzed as well.

Once determined, the scanned data may be compared to the input image data to determine whether the printed image includes image quality defects or other non-uniformities. For example, the analyzer 274 may perform a comparison on a pixel-wise (i.e., a pixel-by-pixel basis) and/or by a location. In some implementations, the analyzer 274 may convert the scanned image data to match the resolution of the original input image data. The analyzer 274 may also perform other imaging processing on the scanned data (e.g., filtering), if desired.

In some implementations, the analyzer 274 may be used to determine not just a certain problem (i.e. a certain parameter exceeds a certain threshold), but that a parameter is consistently getting worse. For example, many non-uniformities may not be currently be at the level to require action, but over time may be increasing in frequency and/or intensity. According to one aspect of the invention, the history of these measurements may be maintained in a log on the machine, and/or transferred remotely so they are made available to a Customer Service Engineer (CSE) for service. As such, the analyzer 274 may identify trends, in addition to specific defects and non-uniformities. This may trigger maintenance and/or repair action. Optionally, the system may request a reprint of any pages if a desired parameter is not achieved.

After being scanned by the scanning module 270, the printed relevant pages are transferred to a sheet buffer 274 via media path 253. The sheet buffer 274 may include any device for temporarily storing one or more printed sheets of media (e.g., a hopper, bin, catch tray, or the like) and later retrieving a particular sheet therefrom. When a relevant page is requested by the planner/scheduler 220, the sheet buffer 274 releases the requested relevant page from the sheet buffer 274 for reintroducing into the output media path 250, via media path 254, and onto the output destination/finisher 280. Advantageously, the printed relevant pages are reinserted into the proper order (position) in the output document.

The printing and scanning speeds may be same or they may be different. If the printing speed is much greater than the scanning speed, then the system may need to scan fewer relevant pages (to maintain the full productivity of the marking engine) and/or print them further ahead of time. Alternatively, if scanning speed (plus analysis time) is greater than the printing speed, the planner/scheduler 220 may have more flexibility with scheduling relevant pages. The media path speed is at least as same as the printing speed. In fact, at certain places in the system, the media may be traveling significantly faster than would be required for printing. This is due to the need to accelerate sheet to provide physical separation for sorting into finishing locations.

The output destination/finisher 280 may include one of a plurality of output destinations, or output trays. In one embodiment, one or more of the output trays may be used as a purge tray. The output destination/finisher 280 may also perform final collating of the pages of the document. As is known in the art, the finisher can include any post-printing accessory device such as a sorter, mailbox, inserter, interposer, folder, stapler, stacker, hole puncher, collater, stitcher, binder, envelope stuffer, postage machine, or the like.

The difference between the scanned image data (e.g., what was actually printed) and the input image data (e.g., what should have been printed) may be used for various purposes. For example, it may be used for modifying the process controls parameters of the marking engine 232 to compensate for variations and inconsistencies in the output image, and/or to generate error signals. In some implementations, the process controls parameters of the marking engine 232 may be automatically adjusted to compensate for variations and inconsistencies in the output image. Such process control parameters may include, but are not limited to, one or more of the following: fuser roll temperature, dwell time in the fuser roll nip, process speed, additional heat energy supplied, nip width of the fuser roll nip and pressure on the fuser rolls.

Also, the planner/scheduler 220 may send an error signal indicating that a failure has occurred and that a desired parameter is not achieved. For example, the scanning module 270 may provide feedback 275 to the planner/scheduler 220 based on scanned image data. The planner/scheduler 220 may communicate with the print controller 210. Alternatively, or additionally, the scanning module 270 may provide feedback to the print controller 210 directly.

The system may be used in conjunction with a tightly integrated parallel printing (TIPP) system, where multiple marking machines are controlled to output a single print job, for example, as disclosed in U.S. Pat. Nos. 7,206,532; 7,136,616 and 7,024,152, herein incorporated by reference, by their entireties. The system may be configured to advantageously monitor toner performance and match the performance of each of the multiple print engines in a TIPP system.

Figure 3:
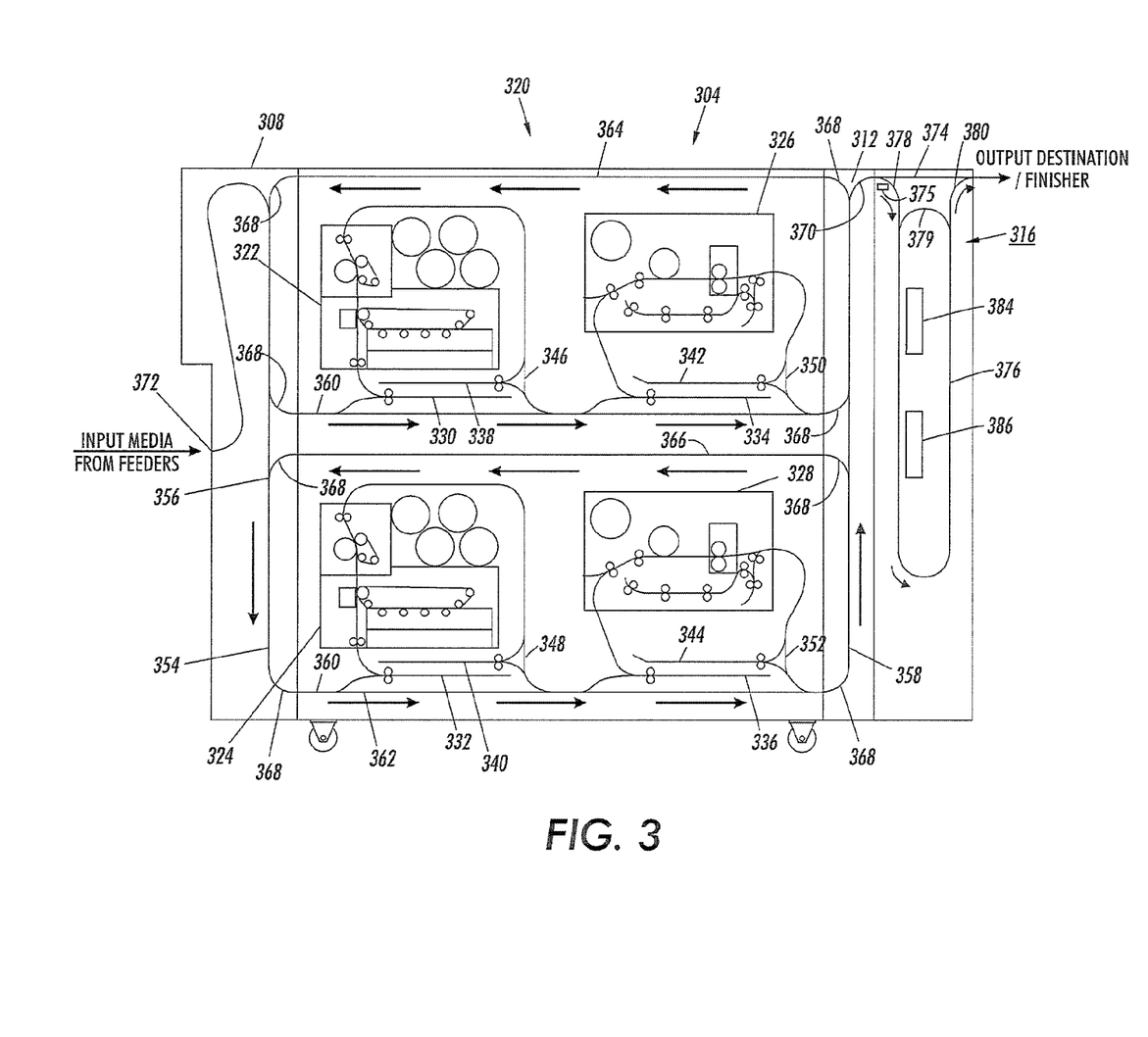
FIG. 3 illustrates an exemplary TIPP system, according to embodiment of the invention.

Referring to FIG. 3, a TIPP system according to embodiment of the invention is shown. The printing device 304 which includes a distributor 308, a collector 312, an output interface module 316 and a plurality 320 of integrated marking engines (IMEs) including a first 322, second 324, third 326 and fourth 328 integrated marking engine. For instance, the first and second 322, 324 IMEs are color integrated marking engines and the third and fourth, 326, 328 render images using only a single colorant (e.g., black). Each of the first, second, third and fourth IMEs 322, 324, 326, 328 include input inverters 330, 332, 334, 336 and output inverters 338, 340, 342, 344, respectively. The output inverters 338, 340, 342, 344 are associated with inverter bypasses 346, 348, 350, 352. An interposer 354 provides a plurality of overlapping media delivery paths for transporting media (e.g., sheets or pages) from the distributor 308 to the IMEs 322, 324, 326, 328, the collector 312 and/or to the output interface module 316.

The interposer 354 may include a downward path 356, an upward path 358, first and second output bound paths 360, 362 and first and second return paths 364, 366. Interconnects 368 link the output bound and return paths 360, 362, 364, 366 with the downward 356 and upward 358 paths and, thereby, with each other. Therefore, the interposer 354 provides paths for transporting media (e.g., pages, sheets) from any IME to any other IME and from any IME to an output interconnect 370 for delivering the media (e.g., sheets or pages) to the output interface module 316.

For example, a page received at an input 372 of the distributor 308 is transported to the downward path 356 of the interposer 354. From the downward path 356 the sheet may be delivered to either the first 360 or second 362 output bound paths. From there, the page may enter any of the IMEs 322, 324, 326, 328 through their respective input inverters 330, 332, 334, 336. Once processed by the selected IME 322, 324, 326, 328 the page is delivered back to the output bound path 360, 362 from which it was received.

In this exemplary embodiment, the page may be delivered back to the output bound path 360, 362 either directly, via the output inverter bypass 346, 348, 350, 352 or after being inverted by the respective output inverter 338, 340, 342, 344.

Once delivered to the output bound path 360, 362 the page can be delivered to an adjacent IME (e.g., 326, 328) or delivered to the upward path 358 portion of the interposer 354 to be transferred to a return path 364, 366 or to the output link 370 and output interface module 316. From the return paths 364, 366 the page can be transferred to the downward portion 356 of the interposer 354 and routed to the input of any of the IMEs 322, 324, 326, 328 from the output bound paths 360, 362 as described above. Additionally, the output interface module 316 includes a scanning module 384 and a sheet buffer 386, positioned adjacent to the auxiliary path 376. A diverter mechanism 375 is provided for selectively diverting relevant pages from the output media path 374 to the auxiliary media path 376 via output interface link 378.

Figure 4A:
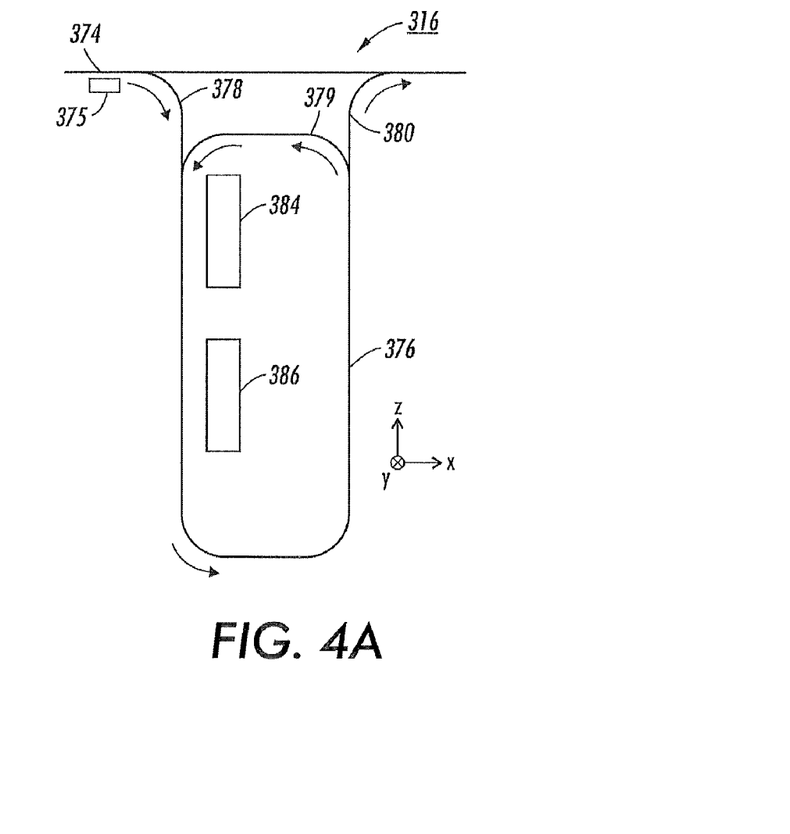
FIG. 4A shows more a detailed view of the output interface module shown in FIG. 3.
Figure 4B:
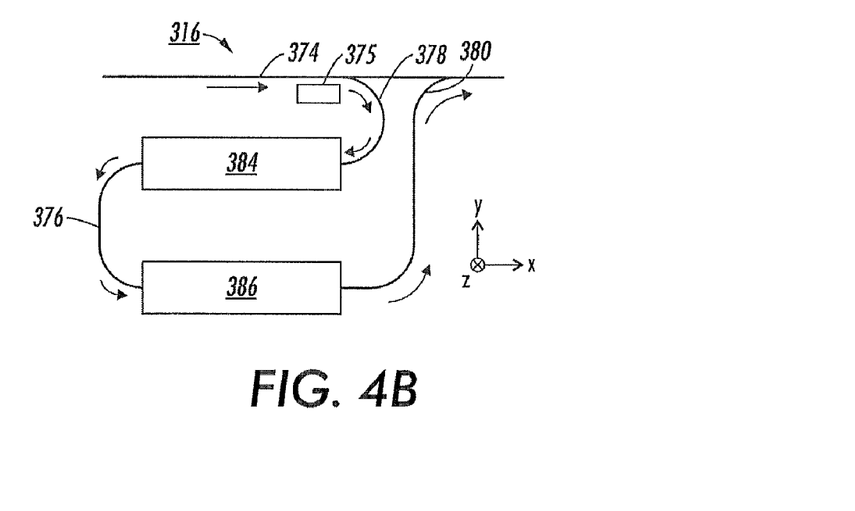
FIG. 4B shows an alternative embodiment of the output interface module shown in FIG. 3.

FIG. 4A shows a more detailed view of the output interface module 316, shown in FIG. 3. The output interface module 316 includes an output media path 374, an auxiliary media path 376 and first and second output interface media links 378, 380 interconnecting the auxiliary media path 376 with the output media path 374. The auxiliary media path 376 may include a return media path 379 (FIG. 4A) for recirculation relevant pages. However, the return media path 379 may be omitted in some embodiments (see FIG. 4B). While FIGS. 3 and 4A show the output interface module 316 oriented in the vertical plane, FIG. 4B shows an alternative embodiment of the output interface module 316 oriented in the horizontal plane. It will be appreciated though that these elements may each be oriented in different planes and/or in any non-orthogonal manner as available space and the desired compactness in the printing system may dictate.

The interposer 354, the output link 370 and the first output interface link 378 provide a path from any of the IMEs 322, 324, 326, 328 to the auxiliary path 376 and thereby to the scanning device 384. For example, a first media delivery path includes the first outbound path 360, an upper portion of the upward path 358, the output link 370, the first output interface link 378 and the auxiliary path 376. The first output path can carry media from the first or third IME 322, 326 to the scanning device 384. A second media delivery path includes, for example, at least a portion of the second output bound path 362, the upward path 358, the output link 370, the first output interface link 378 and the auxiliary media path 376. The second output path can transport media (e.g., sheets or pages)

from the second and fourth IMEs 324, 328 to the scanning module 384 via an auxiliary path 376.

The interposer may transport media from any portion of the interposer to any other portion of the interposer 354. Therefore, there exists a path from any of the IMEs or media sources 322, 324, 326, 328 to any portion of the interposer 354. The auxiliary path 376 is provided outside the flow of main document processing job production, which allows relevant pages to be scanned and, analyzed without disrupting or slowing down the output media path 374.

The planner/scheduler 220 schedules the production of relevant pages and controls their delivery to, and examination by the scanning module 384. Information regarding sensed aspects of the relevant page is transferred from the scanning module 384 to the planner/scheduler 220. When appropriate the information regarding sensed aspects of the relevant page may be transferred onto the marking engine controller 230.

The planner/scheduler may use the information regarding the sensed aspects to make adjustments to the rendering process of the IMEs (e.g., 322, 324, 326, 328). For instance, the planner/scheduler may make adjustments that cause the output of the first IME 322 to better match the output of the second IME 324.

In some instances, the part of the image path where adjustments are made to the image data actually resides in one of the IMEs 322, 324, 326 and 328. Alternatively, the scanned image data of the relevant pages may be used by the controller to adjust image path data to compensate for some aspect of a target IME. For instance, a tone reproduction curve may be generated or altered and applied to input image data in order to compensate for a drift in an IME selected for producing an image associated with the adjusted data. Additionally, or alternatively, a warping may be applied to compensate for a skew or other mis-registration sensed in a relevant page.

Information regarding a sensed aspect of a relevant page also be used to adjust a production schedule. For example, the print controller may elect to have a particular portion of a document processing job rendered on the second IME 324 because a color gamut of the second IME 324 better accommodates the portion of the document processing job than does a color gamut of the first IME 322. Additionally, or alternatively, the print controller may elect to use two or more IMEs to render a page if no single IME is capable of producing the required colors of an image, but rendering the image is within the combined capabilities of the plurality of IMEs.

The planner/scheduler may also determine that variation between the IMEs is currently too large. Therefore, the planner/scheduler may schedule opposing pages of a booklet to be rendered on the same IME, thereby reducing likelihood that differences between the IMEs will be noticed. The print controller provides the images in the order requested by the planner/scheduler.

Figure 5:
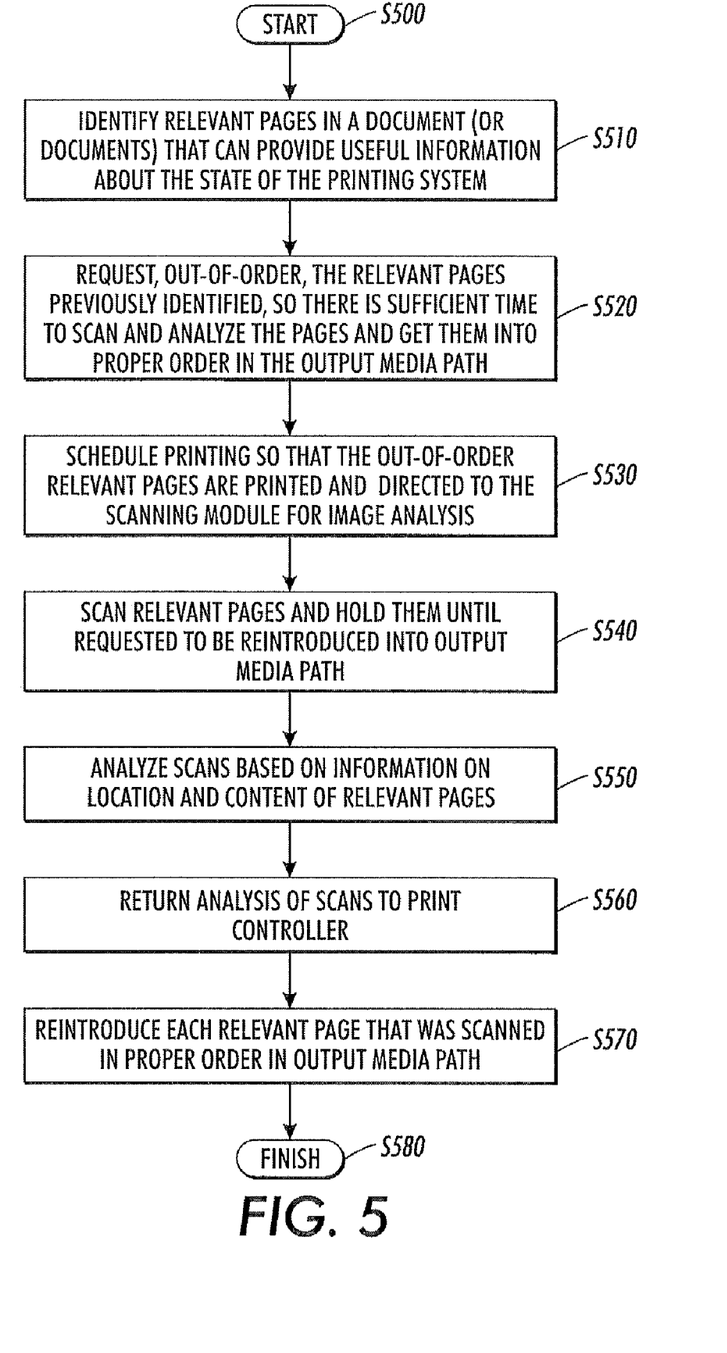
FIG. 5 is a flowchart outlining an exemplary method, according to embodiment of the invention.

FIG. 5 is a flowchart outlining an exemplary method according to one aspect of the invention. As shown in FIG. 5, the process begins in step S500. In step S510, the input image data of a document (or documents) are analyzed by the image analyzer to determine one or more relevant pages that may provide useful information regarding the printing system.

Next in step S520, the planner/scheduler requests, out-of-order, the relevant pages previously identified in step S510, for printing with the marking engine. In step S530, the planner/scheduler schedules the output media path of the marking engine so that these out-of-order relevant pages will be printed and be directed to the scanning module for separate image analysis so that there is sufficient time to scan these page and later reintroduce them into the proper order in output media path. The relevant pages and non-relevant pages are each printed with the marking engine, albeit in a different order than the order of the input image data.

In step S540, the printed relevant pages are diverted from the output media path for scanning and held in the sheet buffer until the scheduler/planner requests that these pages be each reintroduced into the output media path. Here, each relevant page is transferred to the scanning module for individual scanning. Raw scanned image data is transferred to the scan analyzer.

Next in step S550, the scan analyzer analyzes the raw scanned image data returned form the scanning device. Advantageously, the scanning analyzer recognizes and/or notices non-uniformities before the customer may visually notice them with the naked eye. This helps to save resources (e.g., ink, toner, and paper), not wasted on printing test pattern and reprinting customer documents.

Continuing onto step S560, the analysis of the scanned printed relevant pages are returned to the planner/scheduler. Determined regions of interest of the input image data may be compared with corresponding regions of interest of the scanned image data. Errors between the input image data and the scanned image data may be determined based on converted differences.

In step S570, the printed relevant pages may be released one by one from the sheet buffer and reintroduced into the proper order (position) in output media path. Lastly, the process finishes in step S580.

EXAMPLE

Figure 6A:
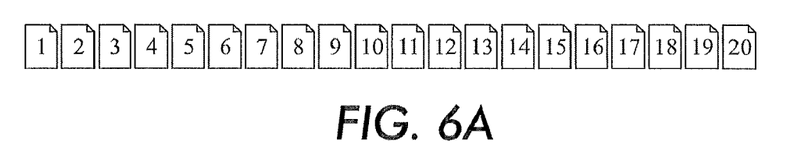
FIGS. 6A-6E illustrate an exemplary scenario for printing a 20 page document, in accordance with an embodiment of the invention.

FIGS. 6A-6E illustrate an exemplary scenario for printing a 20 page document, in accordance with an embodiment of the invention FIG. 6A illustrate the input image data for the 20 page document. The pages are initially ordered (from left to right in the figure) for printing.

Figure 6B:
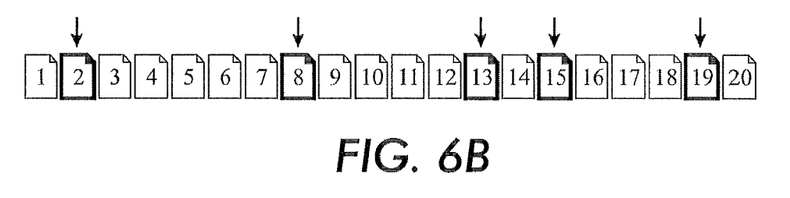

As shown in FIG. 6B, the image analyzer has determined that pages 2, 8, 13, 15 and 19 are relevant pages that may provide useful for determining system performance (for a total of five relevant pages).

Figure 6C:
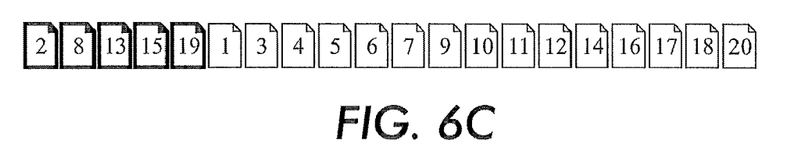

Based on this determination by the images analyzer, the planner/scheduler reschedules the printing order of relevant pages 2, 8, 13, 15 and 19 sufficiently ahead of the remaining pages, such that they can be scanned, analyzed, and reintroduced back into the output media path in the correct order as the other pages are printed. One possible printing schedule is shown in FIG. 6C, in which the relevant pages are printed first and foremost. However, it will be appreciated that other printing schedules are possible and may depend on a number of factors. For example, the planner/scheduler, alternatively, might schedule pages 2, 8, 1, 3, 4, 13, 15, 19, 5, 6, 7, 9, 10, . . . etc. for printing if a 2-page buffer provides sufficient lead-time for scanning and analyzing. The scheduling may be optimized at print time and may be different for different marking engines and for the media being used.

Once each of those relevant pages have been printed by the marking engine they are each diverted from the media path to the scanning module and then the sheet buffer.

Figure 6D:
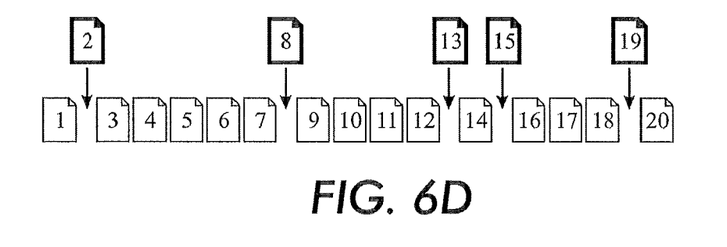

FIG. 6D shows the output media path, over time, as each of the eligible pages held in the sheet buffer is released into the output media path in the correct order. In this scenario, once (non-relevant) page 1 has passed through the marking engine, relevant page 2 can then be released from the sheet buffer and reintroduced into the output media path behind page 1. Thereafter, non-relevant pages 3-7 will continue from the marking engine along the output media path, until such time that relevant page 8 is released from the sheet buffer and reintroduced into the output media path. The process is similar for each of the remaining relevant pages 13, 15 and 19.

Figure 6E:
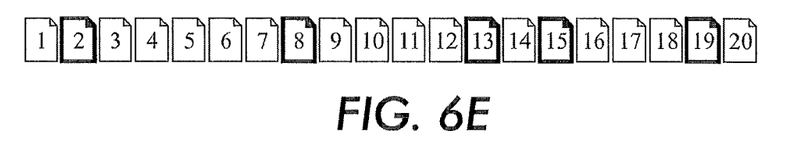

Finally, FIG. 6E shows the output destination/finisher in which all 20 pages of the document have been successfully printed and are properly ordered as in the original input image data (FIG. 6A).

The system and method may be used in different applications such as, for example, xerographic systems, laser printing systems, solid ink jet printing systems, and ink jet printing systems.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. An image printing system configured to analyze printed documents, the system comprising:
   an image analyzer configured to analyze input image data on pages of a document arranged in a first order and to identify therefrom one or more relevant pages that provide diagnostic information regarding a state of the printing system;
   a scheduler configured to schedule printing the pages of the document in a second order different from the first order such that the one or more relevant pages are printed out of order from the first order;
   a marking engine constructed to print images on the pages of the document based on the input image data and the second order;
   a scanner for scanning the images printed on the one or more relevant pages while the remaining pages of the documents are printed; and
   a buffer for holding the one or more printed relevant pages post-scanning and inserting the one or more relevant pages into the remaining pages of the document, whereby the printed pages of the document are arranged in the first order.

2. The system according to claim 1, further comprising a page diverter for diverting the one or more relevant pages from a media path to the scanner.

3. The system according to claim 1, further comprising a scan analyzer for analyzing scanned image data of the one or more relevant pages.

4. The system according to claim 3, wherein the scan analyzer is configured to examine differences between the input image data and the scanned image data of the one or more relevant pages.

5. The system according to claim 3, wherein the scan analyzer is configured to determine at least one parameter selected from the group consisting of: gloss, differential gloss, color, color difference, reflectance at specific wavelengths, background noise, image geometries, image alignment, size of image, image magnification, non-uniformity errors, streaks, smudges, mottle, registration, bands, streaks, and line edge noise.

6. The system according to claim 3, wherein the scan analyzer is configured to maintain a history of measurement analyses.

7. The system according to claim 1, further comprising an output destination/finisher that includes one or a plurality of output destinations or output trays.

8. The system according to claim 1, wherein the scanner includes at least one selected from the group consisting of: a digital scanner, full width array (FWA) sensor; charge-coupled device (CCD) scanning technology and optical arrangements; and a full-width gloss scanning device.

9. The system according to claim 1, wherein the image analyzer includes one or more dictionary files for assisting in determining the eligibility of a relevant page.

10. The system according to claim 9, wherein each of the dictionary files defines acceptable parameter values for one or more of the following: a predetermined user, a predetermined marking engine, a predetermined machine model, and predetermined media type.

11. The system according to claim 10, wherein the one or more parameters in the one or more dictionary files are modifiable by a user.

12. The system according to claim 10, wherein the one or more dictionary files automatically capture the one or more parameters from the system.

13. The system according to claim 1, wherein the image analyzer analyzes input image data for one or more additional documents ahead of the document in queue, and uses the analyzed data to identify the one or more relevant pages of the document.

14. A method for analyzing printed documents using an image printing system, the method comprising:
   analyzing input image data on pages of a document arranged in a first order to identify therefrom one or more relevant pages that provide diagnostic information regarding a state of the printing system;
   scheduling to print the pages of the document in a second order different from the first order such that the one or more relevant pages are printed out-of-order from the first order;
   printing images on the pages of the document based on the input images data and the second order;
   scanning the images printed on the one or more relevant pages while the remaining pages of the documents are printed; and
   inserting the one or more relevant pages post-scanning into the remaining pages of the documents, whereby the printed pages of the documents are arranged in the first order.

15. The method according to claim 14, further comprising diverting the one or more relevant pages from a media path for scanning.

16. The method according to claim 14, further comprising analyzing scanned image data of the one or more relevant pages.

17. The method according to claim 16, wherein the analyzing comprises examining differences between the input image data and the scanned image data of the one or more relevant pages.

18. The method according to claim 16, wherein the analyzing comprises determining at least one parameter selected from the group consisting of: gloss, differential gloss, color, color difference, reflectance at specific wavelengths, background noise, image geometries, image alignment, size of image, image magnification, non-uniformity errors, streaks, smudges, mottle, registration, bands, streaks, and line edge noise.

19. The method according to claim 16, wherein the analyzing comprises maintaining a history of measurement analyses.

20. The method according to claim 14, further comprising outputting printed pages to an output destination/finisher that includes one or a plurality of output destinations or output trays.

21. The method according to claim 14, wherein the scanning utilizes at least one device selected from the group consisting of: a digital scanner, full width array (FWA) sensor; charge-coupled device (CCD) scanning technology and optical arrangements; and a full-width gloss scanning device.

22. The method according to claim 14, wherein the image analyzer includes one or more dictionary files for assisting in determining the eligibility of a relevant page.

23. The method according to claim 22, wherein each of the dictionary files defines acceptable parameter values for one or more of the following: a predetermined user, a predetermined marking engine, a predetermined machine model, and predetermined media type.

24. The method according to claim 23, further comprising modifying the one or more parameters in the one or more dictionary files.

25. The method according to claim 23, wherein the one or more dictionary files automatically capture the one or more parameters from the system.

26. The method according to claim 14, further comprising analyzing input image data for one or more additional documents ahead of the document in queue, and using the analyzed data to identify the one or more relevant pages of the document.

* * * * *